(12) United States Patent
Lamberton et al.

(10) Patent No.: US 7,003,581 B1
(45) Date of Patent: Feb. 21, 2006

(54) SYSTEM AND METHOD FOR IMPROVED LOAD BALANCING AND HIGH AVAILABILITY IN A DATA PROCESSING SYSTEM HAVING AN IP HOST WITH A MARP LAYER

(75) Inventors: Marc Lamberton, Antibes (FR); Eric Ley-Abegnoli, Nice (FR); Pierre Secondo, Tourettes-sur-Loup (FR); Pascal Thubert, Vence (FR)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/523,056

(22) Filed: Mar. 10, 2000

(30) Foreign Application Priority Data

Mar. 30, 1999 (EP) .................................. 99480017

(51) Int. Cl.
*G06F 15/173* (2006.01)
(52) U.S. Cl. .................... 709/238; 370/218; 370/219; 370/220
(58) Field of Classification Search ................ 370/392, 370/401, 410, 235, 238; 709/238, 236, 201, 709/203, 226, 229; 379/221
See application file for complete search history.

(56) References Cited

U.S. PATENT DOCUMENTS

| | | | | |
|---|---|---|---|---|
| 5,473,599 A | * | 12/1995 | Li et al. ...................... 370/219 |
| 5,539,815 A | * | 7/1996 | Samba ................... 379/221.07 |
| 5,668,952 A | | 9/1997 | Slane ...................... 395/200.75 |
| 5,774,660 A | * | 6/1998 | Brendel et al. .............. 709/201 |
| 5,835,696 A | | 11/1998 | Hess ...................... 395/182.08 |
| 5,999,536 A | * | 12/1999 | Kawafuji et al. ............ 370/401 |
| 6,016,319 A | * | 1/2000 | Kshirsagar et al. ......... 370/410 |
| 6,049,528 A | * | 4/2000 | Hendel et al. .............. 370/235 |
| 6,078,960 A | * | 6/2000 | Ballard ....................... 709/229 |
| 6,112,248 A | * | 8/2000 | Maciel et al. ............... 709/238 |
| 6,157,644 A | * | 12/2000 | Bernstein et al. ........... 370/392 |
| 6,182,139 B1 | * | 1/2001 | Brendel ...................... 709/226 |
| 6,185,601 B1 | * | 2/2001 | Wolff ......................... 709/203 |
| 6,779,039 B1 | * | 8/2004 | Bommareddy et al. ..... 709/238 |
| 6,894,978 B1 | * | 5/2005 | Hashimoto .................. 370/238 |
| 2002/0029286 A1 | * | 3/2002 | Gioquindo et al. | |

FOREIGN PATENT DOCUMENTS

EP        1 041 776 A1      4/2000

OTHER PUBLICATIONS

A. Bruce McDonald et al., "ARP Versus ES-IS: Performance Evaluation of Neighbour-Greeting Protocols," *The Computer Journal*, vol. 39, No. 10, 1996, pp. 854-867.

(Continued)

*Primary Examiner*—John Follansbee
*Assistant Examiner*—Dustin Nguyen
(74) *Attorney, Agent, or Firm*—Winstead Sechrest & Minick P.C.

(57) ABSTRACT

A data transmission system and method for transmitting packetized data from an Internet Protocol (IP) host, having at least an IP layer and a network layer, to a plurality of workstations by the intermediary of an IP network, wherein the IP host is connected to the IP network via a layer 2 network interfacing the IP network with a set of routers. The IP host further includes a Multiple Address Resolution Protocol (MARP) layer between the IP layer and the network layer for selecting one of the set of routers in response to the next hop IP addresses provided by the IP layer to the MARP layer when a packet of data is be transmitted from the IP host to one of the workstations.

12 Claims, 4 Drawing Sheets

OTHER PUBLICATIONS

R. Gareiss, "Web Sites That Never Falter", Data Communications, vol. 27, No. 5, Apr. 1, 1998, pp. 28-29 XP000751726.

McDonald, A. Bruce et al, "ARP Versus ES-IS: Performance Evaluation of Neighbour-Greeting Protocol," The Computer Journal, vol. 39 (No. 10), p. 854-867, Jun. 1997.

* cited by examiner

SYSTEM AND METHOD FOR IMPROVED LOAD BALANCING AND HIGH AVAILABILITY IN A DATA PROCESSING SYSTEM HAVING AN IP HOST WITH A MARP LAYER

TECHNICAL FIELD

The present invention relates in general to data processing systems, and in particular, to a new way for loading balancing outgoing Internet Protocol (IP) packets from an IP host such as a large Web server, and relates in particular to a multiple Address Resolution Protocol (MARP) functionality for an IP data transmission system.

BACKGROUND INFORMATION

Modern digital networks are made to operate over different transmission media and interconnect upon request a very large number of users (e.g., hosts) in applications through fairly complex digital communication networks.

Do to the large variety of users' profiles and distributed applications, the traffic is becoming more and more bandwidth consuming, non deterministic and requiring more connectivity. This has been the driver for the emergence of fast packet switching techniques in which data from different origins are chopped into fixed or variable length packets or datagrams, and then transferred, over high-speed digital networks, between a data source and target terminal equipment.

Several types of networks have been installed throughout the world, which need to be interconnected for example (e.g., via so-called routers) to optimize the possibilities of organizing traffic between source hosts and target hosts located anywhere in the world. This is made possible by using so-called Internetworking.

Internetwork (also referred to as Internet) facilities use a set of networking protocols such as Transmission Control Protocol/Internet Protocol (TCP/IP) developed to allow cooperating host computers to share resources across the Internetwork. TCP/IP is a set of data communication protocols that are referred to as the Internet protocol (IP) suite. Because TCP and IP are the best known, it has become common to use the term TCP/IP to refer to the whole protocol family. TCP and IP are two of the protocols in this suite. Other protocols of the suite are User Datagram Protocol (UDP), Address Resolution Protocol (ARP), Real Time Protocol (RTP), etc.

An Internet may thus be a collection of heterogeneous and independent networks using TCP/IP, and connected together by routers. The administrative responsibilities for the Internet (e.g., to assign IP addresses and domain names) can be within a single network, for example a Local Area Network (LAN), or distributed among multiple networks.

When the communication of data has to be established from a source host to a particular computer IP destination over an IP network, there are a number of methods to determine the first hop router of the network leading towards this destination. These include running (or snooping) dynamic routing protocol such as Routing Information Protocol (RIP) or Open Shortest Path First (OSPF) version, running an Internet Control Message Protocol (ICMP) router discovery client or using a statically configured default route.

Running a dynamic routing protocol on every end-host may be infeasible for a number of reasons, including administrative overhead, processing overhead, security issues, or lack of a protocol implementation for some platforms. Neighbor or router discovery protocols may require active participation by all hosts on a network, leading to large timer values to reduce protocol overhead in face of a large number of hosts. This can result in significant delay in the detection of a lost (i.e., dead) neighbor, which may introduce unacceptably long "black hole" periods.

The use of a statically configured default route is quite popular, it minimizes configuration and processing overhead on the end-host, and is supported by virtually every IP implementation. This mode of operation is likely to persist as Dynamic Host Configuration Protocols (DHCP) are deployed, which typically provide configuration for an end-host IP address and default gateway. However, this creates a single point of failure. Loss of the default router results in a catastrophic event, isolating all end hosts that are unable to detect any alternate path that may be available.

One solution to solve this problem is to allow hosts to appear to use a single router and to maintain connectivity even if the actual first hop router they are using fails. Multiple routers participate in this protocol and in concert create the illusion of a single virtual router. The protocol insures that one and only one of the routers is forwarding packets on behalf of the virtual router. End hosts forward their packets to the virtual router. The router forwarding packets is known as the active router. A standby router is selected to replace the active router should it fail. The protocol provides a mechanism for determining active and standby routers using the IP addresses on the participating routers. If an active router fails, a standby router can take over without a major interruption in the host's connectivity.

Another similar approach is the use of Virtual Router Redundancy Protocol (VRRP) designed to eliminate the single point of failure inherent in the static default routed environment. VRRP specifies an election protocol that dynamically assigns responsibility for a virtual router to one of the VRRP routers on a LAN. The VRRP router controlling the IP address (es) associated with a virtual router is called the Master and forwards packets sent to these IP addresses. The election process provides dynamic fail-over in the forwarding responsibility should the Master become unavailable. Any of the virtual router's IP addresses on a LAN can then be used as the default first hop router by the end-hosts. The advantage gained by using VRRP is a higher availability default path without requiring configuration of dynamic routing or router discovery protocols on every end-host.

Unfortunately, the two solutions above cannot provide load balancing for a given host's traffic because only the router that answered the ARP is used. Also, customers are reluctant to change their main router configuration to enable such a function. Clearly there is a need for a method of providing load balancing for traffic on the Internet.

SUMMARY OF THE INVENTION

Accordingly, an object of the invention is to provide a data transmission system including an Internet Protocol (IP) network wherein it is the IP host that selects directly the default router thereby improving load balancing and high availability.

Another object of the invention is to enable an IP source host to be aware of the availability of a set of candidate default routers and to select one of them dynamically, insuring both load balancing and high availability. Another object of the invention is a method of selecting a router amongst a set of routers for an IP host in a data transmission system including an IP network.

Therefore, the invention relates to a data transmission system for transmitting packetized data from of an IP host having at least an IP layer and a network layer to a plurality of workstations by the intermediary of an IP network and wherein the IP host is connected to the IP network via a layer 2 network interfacing the IP network by a set of routers, the IP host further including a multiple Address Resolution Protocol (MARP) layer between the IP layer in the network layer for selecting one of the set of routers in response to the next hop IP address provided by the IP layer to the MARP layer when a packet of data is to be transmitted from the IP host to one of the workstations.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

The above and other objects, features and advantages of the invention will be better understood by reading the following more particular description of the invention in conjunction with the accompanying drawings wherein.

DETAILED DESCRIPTION

Figure 1:
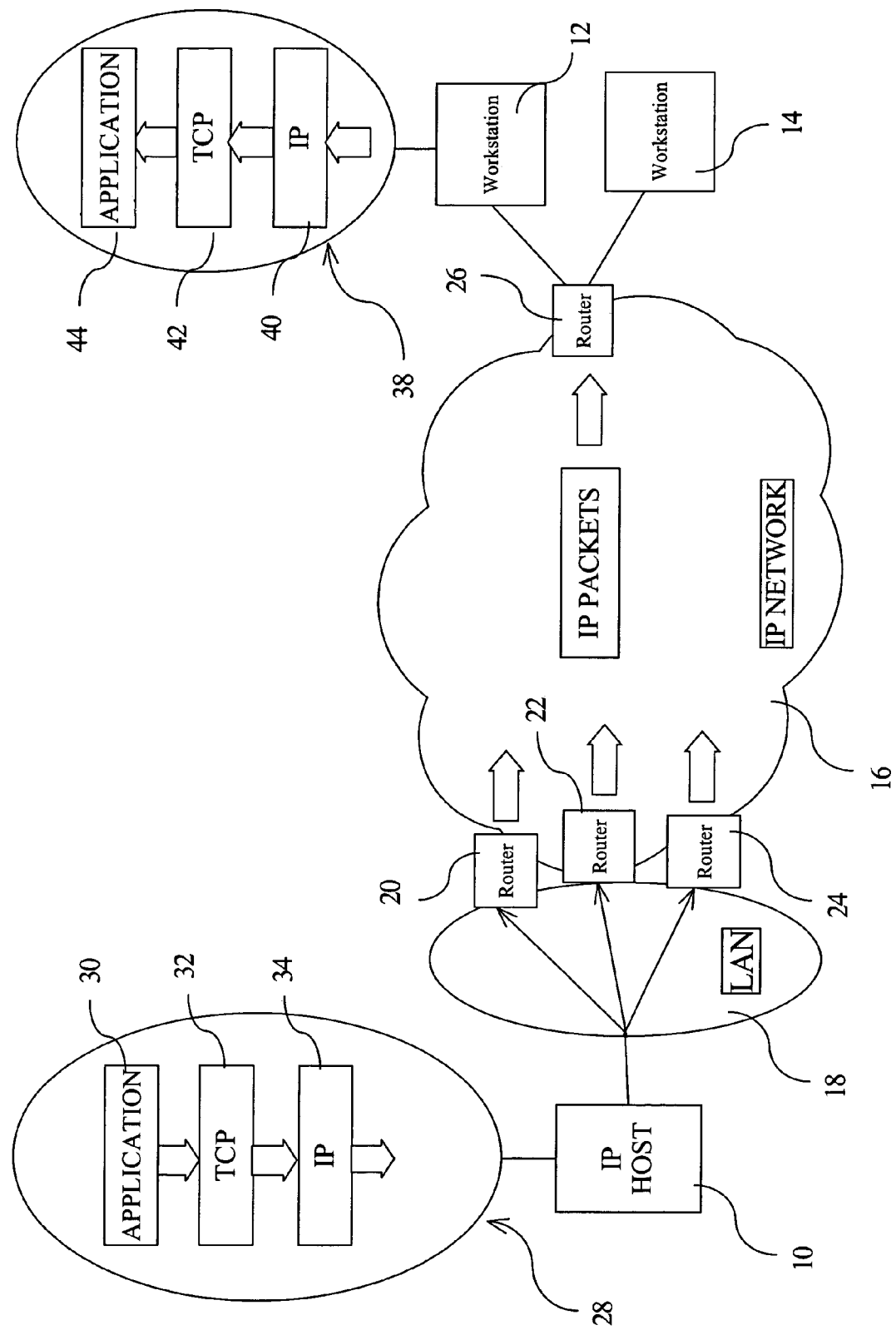
FIG. 1 is prior art which illustrates schematically a data transmission system wherein an Internet Protocol (IP) host can select one router from a set of routers.

In the following description, numerous specific details are set forth to provide a thorough understanding of the present invention. However, it will be obvious to those skilled in the art that the present invention may be practiced without such specific details. In other instances, well-known circuits have been shown in block diagram form in order not to obscure the present invention in unnecessary detail. For the most part, details concerning timing considerations and the like have been omitted in as much as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

FIG. 1 illustrates a data transmission system wherein an Internet Protocol (IP) host 10 has to transmit data to one or several work stations 12, 14 via and IP network 16 such as the Internet. It can be assumed that IP host 10 is connected to IP network 16 by means of a layer 2 network such as a Local Area Network(LAN) 18 which is interfacing to IP network 16 by a set of input routers 20, 22 and 24. The IP packets are routed over the IP network 16 via a plurality of routers (not shown) and then by an output router 26 connected directly (or by means of a layer 2 network) to workstations 12 or 14.

As illustrated in FIG. 1, to communicate over the IP network 16, IP host 10 must implement a layered set of protocols 28 referred as the Internet protocol suite. Without the invention, the protocol suite would be used as follows;

the application layer 30 (level 5) generates a data stream to be sent and passes this data stream to a transport layer;

the transport layer (level 4) such as Transmission Control Protocol (TCP) layer 32, segments the data stream into packets and passes the packet to the IP layer 34 for routing to the destination IP address with an added TCP header;

the IP layer 34 finds the next hop IP address based upon the destination IP address. Normally, with the IP Host which does not run a routing protocol, this address is a default entry that leads to a default router;

IP layer 34 passes the packet to the network layer (not shown) with an added IP header information. As a side parameter, the IP layer informs the network layer of the next hop IP address; the network layer resolves the next hop IP address into a network address of the default router using the ARP protocol and transmits packets over the IP network 16.

Figure 4:
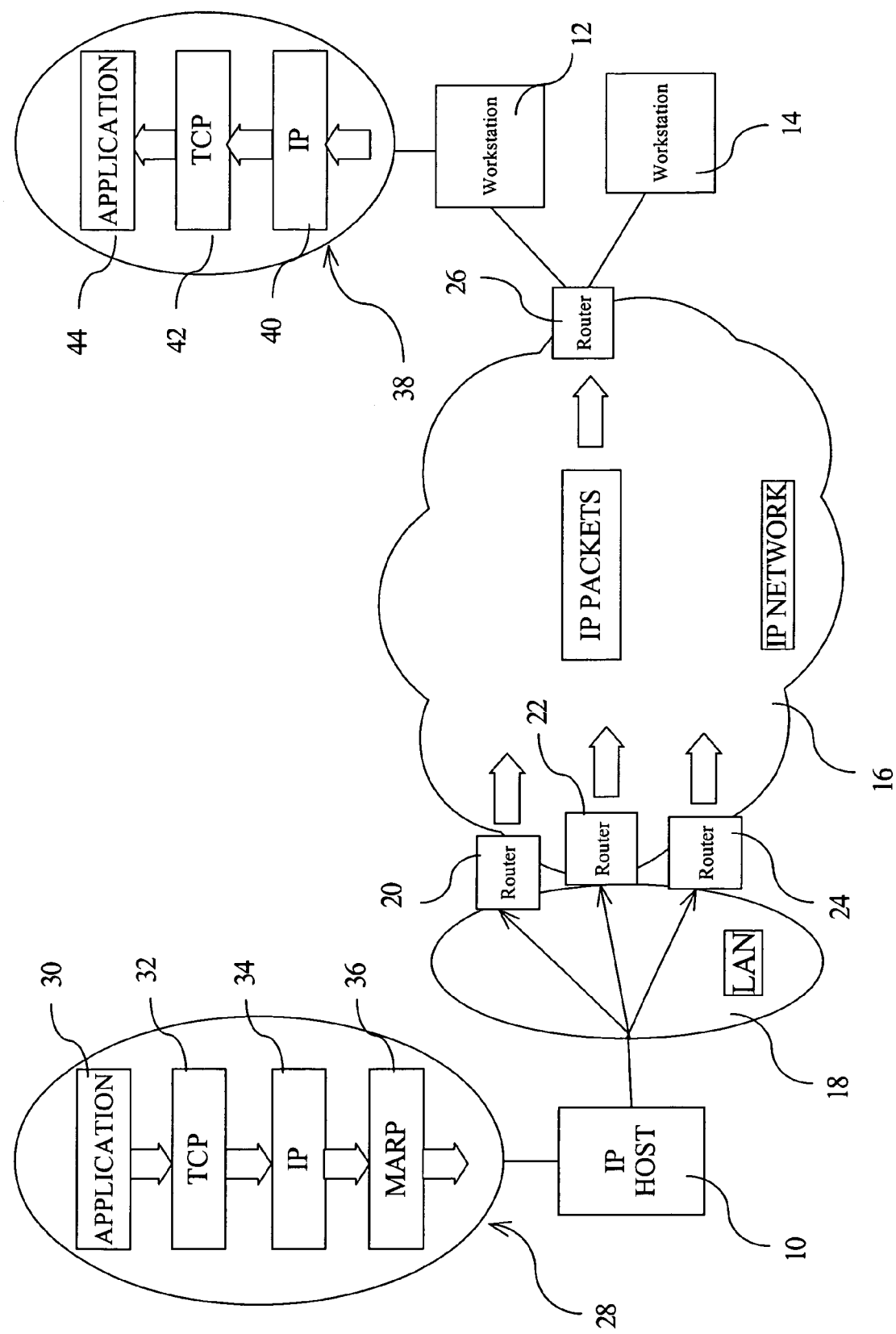
FIG. 4 is illustrates schematically a data transmission system wherein an Internet Protocol (IP) host can select one router amongst a set of routers according to the invention showing a MARP layer.

FIG. 4 illustrates an embodiment of the present invention where a new layer, multiple ARP (MARP) 36 is introduced between IP layer 34 and the network layer. IP layer 34 passes the packet and the next hop IP addresses to MARP layer 36 instead of the network layer. As explained below, this MARP layer 36 runs an algorithm to determine the best physical router (e.g., from exemplary routers 20, 22 or 24) based on parameters defined in packets such as source and destination addresses and ports.

At an exemplary destination workstation 12, a reciprocal protocol suite 38 is implemented. Namely, the network layer passes the IP packets to IP layer 40 which transfers the packets to TCP layer 42 reassembling them into a data stream communicated to the application layer 44. Note that workstation 12 does not include a MARP layer since such a layer is not required for receiving data. However, exemplary workstation 12 could also be an IP Host 10 provided with such a MARP layer used by embodiments of the present invention to transmit IP packets over the network in the same way as illustrated by IP host 10.

Figure 2A:
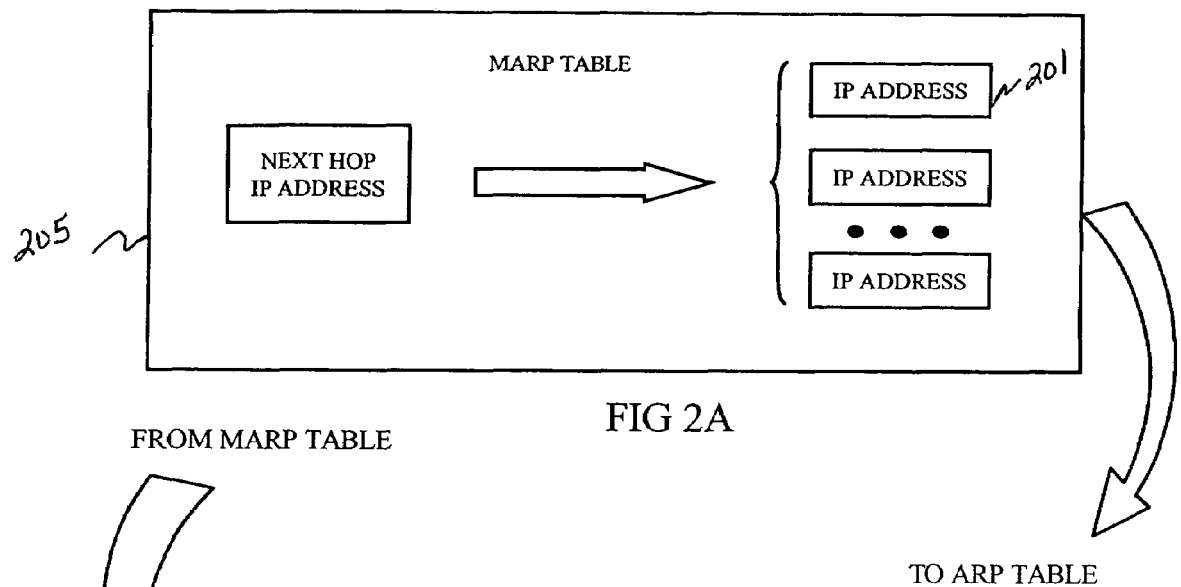
FIGS. 2A and 2B illustrate respectively the Multiple Address Resolution Protocol (MARP) table and the Address Resolution Protocol (ARP) table used in combination to achieve a method according to the invention.

The MARP layer 36 operates with a table called the MARP table illustrated in FIG. 2A. The MARP table maps the next hop IP address into a set of candidate IP addresses corresponding to candidate routers amongst the set of routers (illustrated in FIG. 4 as 20, 22 and 24) interfacing to the IP network 16. In the simplest form, there is only one entry in the MARP table for the default router, the default router points to the set of candidate routers; which may act as default routers. The candidate routers associated with the IP addresses in a MARP table can either be configured to the MARP layer 36 via a configuration tool, or be dynamically acquired using a learning protocol such as an extension to the Dynamic Host Configuration Protocol (DHCP).

Figure 2B:
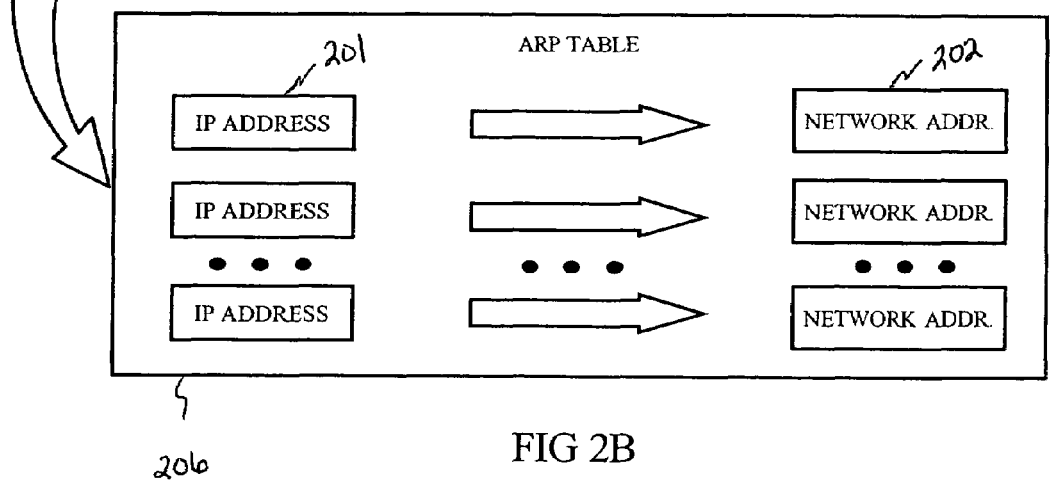

As some ones of the candidate routers may not be active at a given time, the MARP layer 36 uses the ARP table 206 provided by the network layer. The ARP table 206 is illustrated in FIG. 2B. The ARP table 206 maps the IP addresses 201 provided by the MARP table 205 into network addresses 202.

Figure 3:
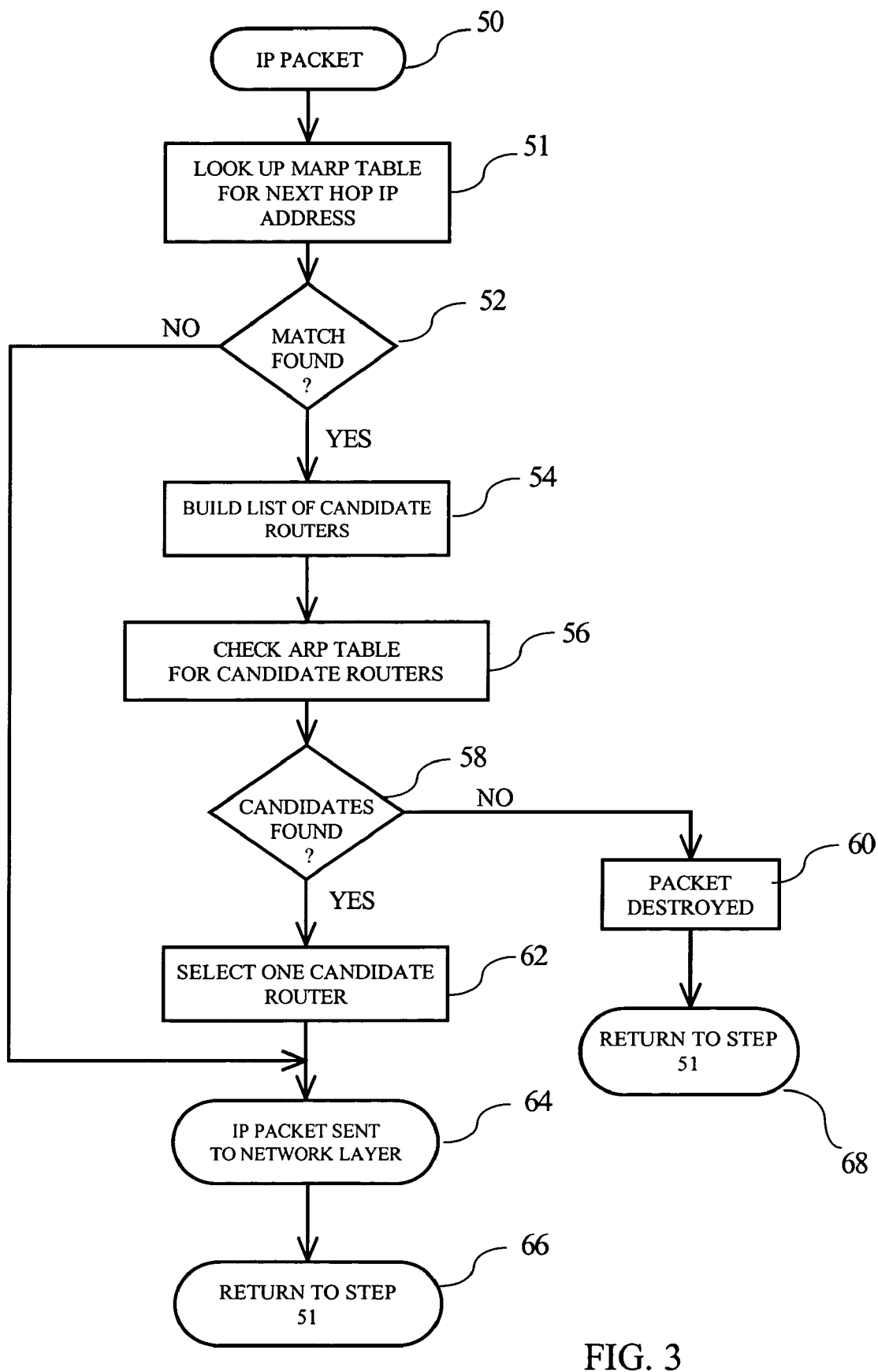
FIG. 3 is a flow chart of a method of selecting a router according to the invention.

Referring now to FIG. 3, the method steps used in the selection of an active router are illustrated in a flow diagram.

When an IP packet 50 is to transmit over the network, the MARP layer 36 is called by the IP layer 34 and the next hop IP address (usually that of the default router) is provided as a parameter for looking up the MARP table (step 51). If the next hop IP address matches an entry in the MARP table (step of 52), an associated list of candidate routers is built (step 54). The candidate routers are then checked one by one in the ARP table (step 56). A determination is made (step 58) of the candidate routers which have a recent entry in the ARP table, and these routers are selected as active candidate routers in step 62. Note that, if no active candid routers can be determined (step 58), the package is destroyed in step 60 and a return is executed in step 68.

Out of the list of the active candidate routers, the MARP layer 36 selects (step 62) one IP address corresponding to a candidate router that is passed to the network layer as a substitute of the original next hop IP address as selected by the IP layer 34. In an embodiment of the present invention, selection is performed on a per packet basis, without a history of previous selection, but this is not the only possible selection algorithm. Other techniques like round robin or byte wise weighting mechanisms may be used alternatively. A hash coding technique as described in European Patent Application 98480062.3 may be use in order to stick a TCP connection to a same candidate router as long as the candidate topology is left unchanged. The hash coding technique uses the destination IP address and a pair of ports in packets. These are mingled with a candidate router's IP addresses, one by one. The highest resulting hash value is selected. Weight coefficients may be used to modify the statistical expectancy of each individual candidate, in order to match their capacity. After a candidate router is selected in step 62, IP packets are sent to the network layer (step 64) so they can be transmitted to the candidate router which has been selected. The IP packet is sent to the network layer in step 64 and a return to step 50 is executed in step 66. It should be noted that the IP packet will be sent directly to the network layer when no matches have been found (step 52) when looking up the next hop address in the MARP table. The IP packet will be sent directly to the network layer, because in this case, the next hop IP address corresponds to a router or a host which is not required to be substituted.

The MARP layer 36 only uses candidates that are already present in the ARP table. As a consequence, the MARP layer 36 uses an out-of-band technique to insure that the ARP table is correctly filled with all the up-to-date information. In embodiments of the present invention, periodic void packets, like ICMP echo, are transmitted to the non-active routers, which are candidate routers that were not present in the ARP table. Upon such packets the ARP function in a network layer will automatically refresh the entry by using the ARP protocol. Also, at an initialization time, one such packet is sent to all the configuration routers to preset the ARP table before a single data is issued by an application layer.

The ARP function insures the freshness of the ARP table by aging the entries and flushing the older ones. To maintain the status of active candidate routers, methods in embodiments of the present invention consist in resetting the age of an entry each time a packet is received from a matching network address. Also, if an entry gets old and before it is flushed by ARP, MARP may flush the ARP table entry before it passes a packet to the network layer with the next hop IP address pointing to that router. Again this forces the network layer to use ARP procedures to check for the router availability.

Although the present invention and its advantages have been described in detail, it should be understood that various changes, substitutions and alterations can be made herein without departing from the spirit and scope of the invention as defined by the appended claims.

What is claimed is:

1. A data transmission system operable for transmitting packet data from an Internet Protocol (IP) host over an IP network comprising:

an IP layer;

a network layer coupled to the IP network, wherein said IP host is coupled to said IP network via a layer 2 network, said layer 2 network interfacing said IP network with a set of routers; and a Multiple Address Resolution Protocol (MARP) layer, said MARP layer between said IP layer and said network layer, said MARP layer operable for selecting one router of said set of routers in response to a next hop IP address provided by said IP layer to said MARP layer when a packet of data is to be transmitted from said IP host over said IP network;

wherein said IP host is provided with an Address Resolution Protocol (ARP), said ARP operable to convert any IP address into a network address of a router to be used in said layer 2 network by mapping said IP address, in an ARP table into a network address of an active router selected from said set of routers;

wherein said MARP layer includes, a MARP table mapping said next hop IP address into a list of IP addresses of routers, said router addresses indicating routers selectable from said set of candidate routers, said IP addresses of said routers being mapped in said ARP table indicating active candidate routers able to be used as routers for transmitting said packet of data from said IP host to one or more of said workstations via said IP network.

2. The data transmission system according to claim 1, wherein in one of said routers is selected amongst said active candidate routers by using hash coding techniques based upon destination IP addresses, a pair of source and destination ports in said packet of data to be transmitted, and said active candidate router IP addresses.

3. A method of selecting a router by an IP host in a data transmission system transmitting packetized data from said IP host having at least an IP layer and a network layer to a plurality of workstations by an intermediary of an IP network, and wherein said IP host is coupled to said IP network via a layer 2 network interfacing said IP network by a set of routers, said method comprising the steps of:

determining a list of candidate routers from said set of routers;

determining a list of active candidate routers from said list of candidate routers, said list of active candidate routers determined before selecting, from said set of routers, said router to be used for transmitting said packetized data; and selecting said router to be used for transmitting said packetized data from said list of active candidate routers.

4. The method according to claim 3, wherein said step of determining said list of active candidate router IP addresses is performed by a Multiple Address Resolution Protocol (MARP) layer between said IP layer and said network layer of said IP host.

5. The method according to claim 4, wherein said step of determining said list of candidate routers is performed by said MARP layer by a look up in a MARP table using a next hop IP address as an entry.

6. The method according to claim 5, wherein said step of selecting said router to use for transmitting said packetized data is performed by using hash coding techniques based upon destination IP addresses, a pair of source and destination ports in said packetized data to be transmitted, and IP addresses of said active candidate routers.

7. A computer program product embodied in a machine readable medium, including programming for selecting a router by an IP host in a data transmission system transmitting packetized data from said IP host having at least an IP layer and a network layer to a plurality of workstations by an intermediary of an IP network, and wherein said IP host is coupled to said IP network via a layer 2 network interfacing said IP network by a set of routers comprising a program of instruction for performing the steps of:

determining a list of candidate routers from said set of routers;

determining a list of active candidate routers from said list of candidate routers, said list of active candidate routers determined before selecting, from said set of routers, said router to be used for transmitting said packetized data; and selecting said router to be used for transmitting said packetized data from said list of active candidate routers.

8. The computer program product according to claim 7, wherein said step of determining said list of active candidate router IP addresses is performed by a Multiple Address Resolution Protocol (MARP) layer between said IP layer and said network layer of said IP host.

9. The computer program product according to claim 8, wherein said step of determining said list of candidate routers is performed by said MARP layer by a look up in a MARP table using a next hop IP address as an entry.

10. The computer program product according to claim 9, wherein said step of selecting said router to use for transmitting said packetized data is performed by using hash coding techniques based upon destination IP addresses, a pair of source and destination ports in said packetized data to be transmitted, and IP addresses of said active candidate routers.

11. An Internet Protocol (IP) network comprising:

an IP host;

a Local Area Network (LAN) coupled to the IP host;

an IP network coupled to the LAN;

a set of workstations coupled to the LAN via the IP network;

said IP host further comprising:

an IP layer;

a network layer coupled to the IP network wherein said IP host is coupled to said IP network via a layer 2 network, said layer 2 network interfacing said IP network with a set of routers; and a Multiple Address Resolution Protocol (MARP) layer, said MARP layer between said IP layer and said network layer, said MARP layer operable for selecting one router of said set of routers in response to a next hop IP address provided by said IP layer to said MARP layer when a packet of data is to be transmitted from said IP host over said IP network;

wherein said IP host is provided with an Address Resolution Protocol (ARP), said ARP operable to convert any IP address into a network address of a router to be used in said layer 2 network by mapping said IP address, in an ARP table into a network address of an active router selected from said set of routers;

wherein said MARP layer includes, a MARP table mapping said next hop IP address into a list of IP addresses of routers, said router addresses indicating routers selectable from said set of candidate routers, said IP addresses of said routers being mapped in said ARP table indicating active candidate routers able to be used as routers for transmitting said packet of data from said IP host to one or more of said workstations via said IP network.

12. The IP network according to claim 11, wherein in one of said routers is selected amongst said active candidate routers by using hash coding techniques based upon destination IP addresses, a pair of source destination ports in said packet of data to be transmitted, and said active candidate router IP addresses.

* * * * *